(12) United States Patent
Udono

(10) Patent No.: US 7,825,633 B2
(45) Date of Patent: Nov. 2, 2010

(54) BATTERY CHARGER

(75) Inventor: Kenro Udono, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 583 days.

(21) Appl. No.: 11/889,599

(22) Filed: Aug. 15, 2007

(65) Prior Publication Data

US 2008/0042620 A1   Feb. 21, 2008

(30) Foreign Application Priority Data

Aug. 16, 2006   (JP) ............................... 2006-221776

(51) Int. Cl.
  *H02J 7/00*   (2006.01)
  *B25J 5/00*   (2006.01)
(52) U.S. Cl. .................. 320/137; 318/568.12
(58) Field of Classification Search ............... 320/135, 320/137; 700/246, 259, 264; 318/568.12
  See application file for complete search history.

(56) References Cited

U.S. PATENT DOCUMENTS

| | | | | |
|---|---|---|---|---|
| 4,736,826 A | * | 4/1988 | White et al. ............ 191/12.2 A |
| 5,220,263 A | * | 6/1993 | Onishi et al. ................. 318/587 |
| 6,515,455 B2 | * | 2/2003 | Hidaka ........................ 320/135 |
| 6,957,712 B2 | * | 10/2005 | Song et al. ................... 180/167 |
| 7,030,592 B2 | * | 4/2006 | Yu ............................... 320/137 |
| 2002/0024320 A1 | * | 2/2002 | Hidaka ........................ 320/135 |
| 2005/0221840 A1 | * | 10/2005 | Yamamoto et al. ........ 455/456.3 |
| 2007/0067930 A1 | * | 3/2007 | Garti ............................. 15/1.7 |

FOREIGN PATENT DOCUMENTS

JP   2001-179663   7/2001
JP   2004237403 A * 8/2004

* cited by examiner

*Primary Examiner*—Edward Tso
*Assistant Examiner*—M'Baye Diao
(74) *Attorney, Agent, or Firm*—Squire, Sanders & Dempsey, LLP

(57) ABSTRACT

An apparatus is capable of charging a battery mounted aboard a robot while avoiding an unstable posture of the robot caused by a power feeding connector coming into contact to a power receiving connector of the robot. A battery charger of the present invention performs control to move the power feeding connecter to connect with the power receiving connector of the robot in a standing posture, so that a moment generated about a target zero moment point (ZMP) of the robot falls within a range of the moment of floor reaction force generatable about the target ZMP.

11 Claims, 7 Drawing Sheets

BATTERY CHARGER

BACKGROUND OF THE INVENTION

1. Field of the Invention

The present invention relates to a battery charger for charging a battery mounted aboard a legged robot movable by movement of a plurality of legs extending from a base body.

2. Description of the Related Art

As a conventional method for charging a battery mounted aboard a legged moving robot, it has been proposed that, for example, a power receiving connector in a robot and a power feeding connector with a chair in a condition in which the robot sits in the chair be connected to charge the battery via the connectors (for example in Japanese Patent Laid-Open Publication No. 2001-179663).

Because the space occupied by the chair is relatively large, however, the battery charger may present an obstacle to a walker at times other than when charging the robot with power. After charging the robot, because the robot must stand up from the chair, the starting time of the robot to move is delayed. In light of these points, it may be preferable to charge the battery of the robot in a standing posture using a more compact battery charger than the chair.

It can be envisioned that the robot is charged in a standing posture. However, because the base body (or upper body) shakes following movements of legs, it may be difficult to connect the power receiving connector provided in the base body of the robot to the power feeding connector fixed to the battery charger. It also can be considered that the robot is static in a standing posture and the power feeding connector of the battery charger drives and connects to the power receiving connector. However, force applied by the connection may cause the robot to shake. It is necessary to move the legs and the like in order to maintain the robot in a stable posture, and by doing this unnecessary consumption of the battery's stored energy might occur.

SUMMARY OF THE INVENTION

Given the above, an object of the present invention is to provide an apparatus for charging a battery that is mounted aboard a robot while avoiding an unstable posture of the robot caused by a power feeding connector coming into contact with a power receiving connector of the robot.

A first aspect of the present invention provides an apparatus for charging a battery mounted aboard a legged moving robot by outputting from a charging power supply, the apparatus includes a power feeding connector connectable to a power receiving connector of the robot, and a controller to move the power feeding connecter to connect with the power receiving connector of the robot in a standing posture, so that a moment generated about a target zero moment point (ZMP) of the robot falls within a range of the moment of floor reaction force generatable about the target ZMP. According to this aspect, the power feeding connector moves to be connected to the power receiving connector of the robot being static in standing posture, the movement of the power feeding connector is controlled so that the moment generated about the target ZMP of the robot does not exceed the moment of floor reaction force generatable about the target ZMP of the robot. Specifically, the movement of the power feeding connector is controlled so that an excessive force that the robot cannot resist in a standing posture does not act on the robot from the power feeding connector. By doing this, when the power feeding connector and the power receiving connector are connected, the unstable posture of the robot can be avoided. It is then not required to move legs to maintain the robot in stable posture, and consumption of the energy stored in the battery mounted aboard the robot can be avoided.

The controller, by connecting the power feeding connector to the power receiving connector of the robot in a standing posture, may move the power feeding connector so that the vertical component of a force applied to the robot become stronger than the horizontal component thereof. When the power feeding connector and the power receiving connector is connected, the force is applied to the robot in the mainly vertical direction so that the force applied to the robot in the horizontal direction can be controlled. By doing this, the robot in a condition of standing posture can avoid excessive lateral swaying or wavering and being in an unstable posture.

The controller may move the power feeding connector to come into contact with a charging part of the robot in a standing posture from an upward direction or a downward direction. When the power feeding connector and the power receiving connector is connected, the force is applied to the robot in upward or downward direction, thereby avoiding excessive lateral swaying or wavering and being an unstable condition.

The battery charger may have a holding mechanism for movably holding the power feeding connector. Even with a slight offset in the standing position of the robot from the correct position, it is possible to connect the power feeding connector to the power receiving connector without forcing a change of the standing position and posture of the robot.

The battery charger may further have a first sensor outputting a signal responsive to the power feeding connector stopping short of a reference connection position relative to the power receiving connector, and an operation instructing section outputting a signal to instruct the robot of a position and posture, or of a corrective action of the position and posture responsive to the output signal from the first sensor. If there is a high possibility that the power feeding connector and the power receiving connector fail to connect, the standing position and posture of the robot are corrected to reconnect the connectors.

The battery charger may also have a second sensor outputting a signal responsive to the power feeding connector moving beyond the reference connection position relative to the power receiving connector, the controller moving the power feeding connector in a direction away from the power receiving connector responsive to the output signal from the second sensor. The robot operates to complete charging of the battery or to pause, and as the power feeding connector and the power receiving connector come into the non-connected condition, the charging current supply is stopped, and the power feeding connector can be moved away from the power receiving connector so that the robot can move without impedence responsive to this condition.

The battery charger may have a buffer mechanism buffering an external force that the power feeding connector receives. When the power feeding connector is connected to the power receiving connector, a situation in which the counterforce received from the robot applies excessive stress to the power feeding connector or the members linked with the power receiving connector can be avoided. In the case in which the robot mounts a servomotor for operating it or for controlling posture, and also the battery charger mounts a servomotor for driving the power feeding connector a situation in which the motors directly interfere with one another and oscillate can be avoided.

The controller verifies, in one or a plurality of steps, whether or not the standing position and posture of the robot are in an appropriate condition such that the power feeding connector can be moved as is to connect to the power receiving connector, and, providing that the controller verifies that the standing position and posture of the robot are in an appropriate condition, moves the power feeding connector in a direction in which the power feeding connector approaches the power receiving connector. After verifying that, considering the position and posture of the robot, the power feeding connector can connect to the power receiving connector, and by driving the power feeding connector, the connectors connect reliably.

The controller may determine whether or not the power feeding connector and the power receiving connector are connected, and, providing that the controller verifies that the connectors are connected, may cause output of a charging current from the charging power supply. Because the connection of the power feeding terminal and the power receiving terminal is verified, the charging current is output from the charging power supply, and the battery mounted aboard the robot is charged safely and reliably.

The battery charger may further have an arm to the end of which the power feeding connector is attached. The controller causes the power feeding connector to connect to the power receiving connector by driving the arm in a given direction from an initial condition. The power feeding connector can be driven by a relatively simple driving method such that the arm is driven, (for example, such that the arm is rotated) in a given direction from an initial condition.

In the above aspect, the battery charger has a base that houses the power feeding connector and the arm. When it is not necessary to charge the battery mounted aboard the robot, by housing the arm and the power feeding connector in a base, a situation in which the arm blocks the movement of the robot is avoided.

DETAILED DESCRIPTION OF THE PREFERRED EMBODIMENTS

The following description of preferred embodiments with reference to the accompanying drawings describes a battery charger of the present invention.

Figure 4A:
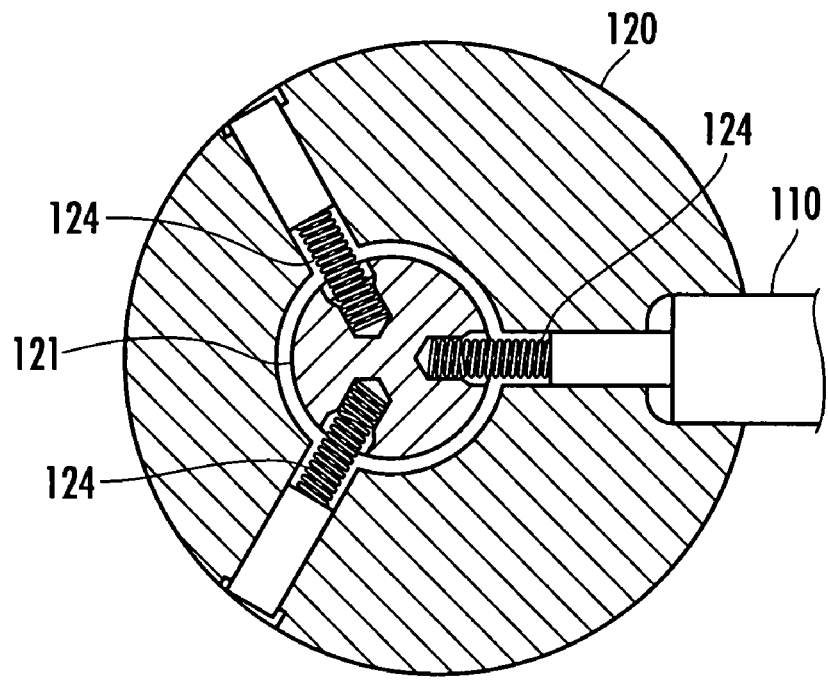
FIG. 4 is a drawing describing the configuration of a battery charger of the present invention.
Figure 4B:
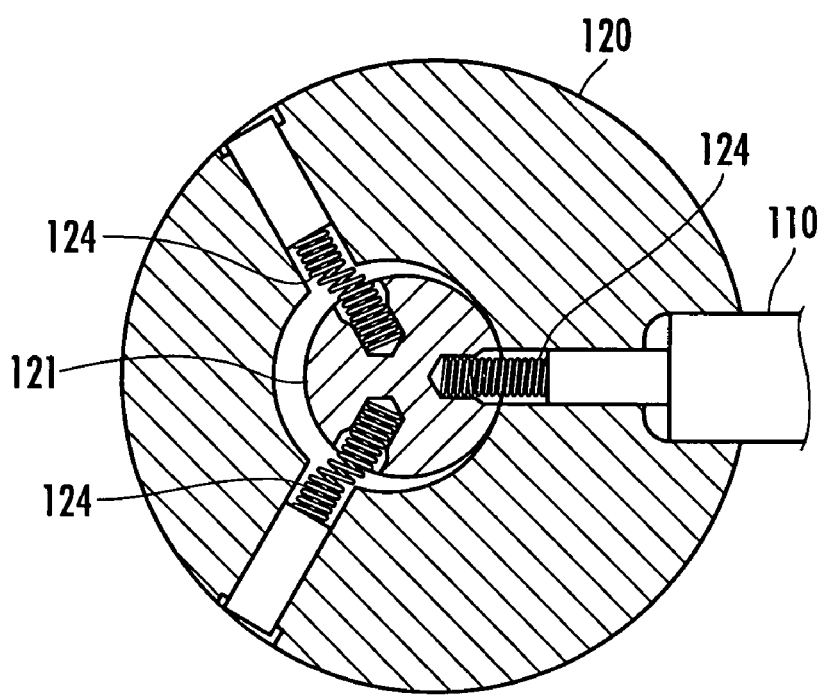
Figure 5:
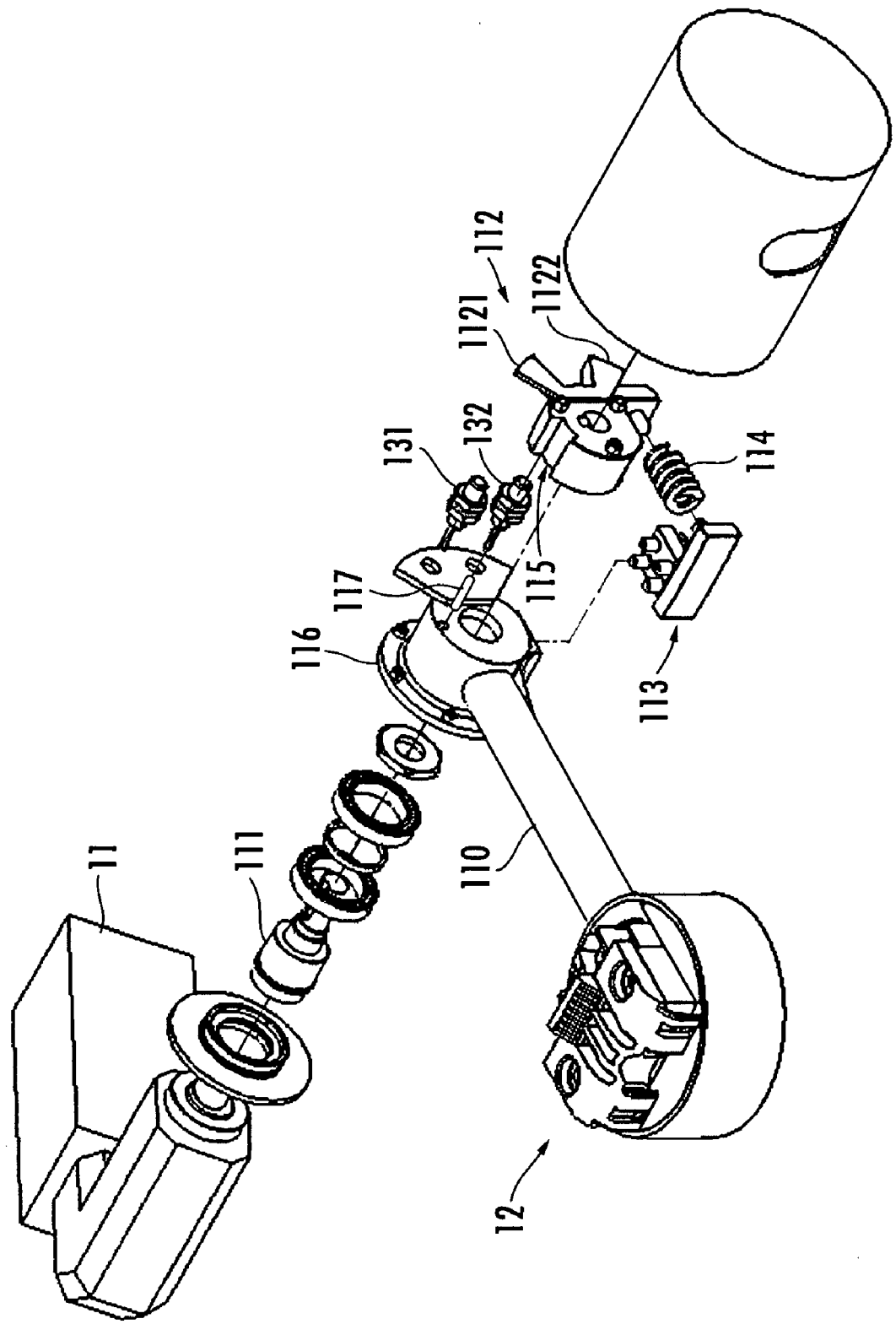
FIG. 5 is a drawing describing the configuration of a battery charger of the present invention.
Figure 6:
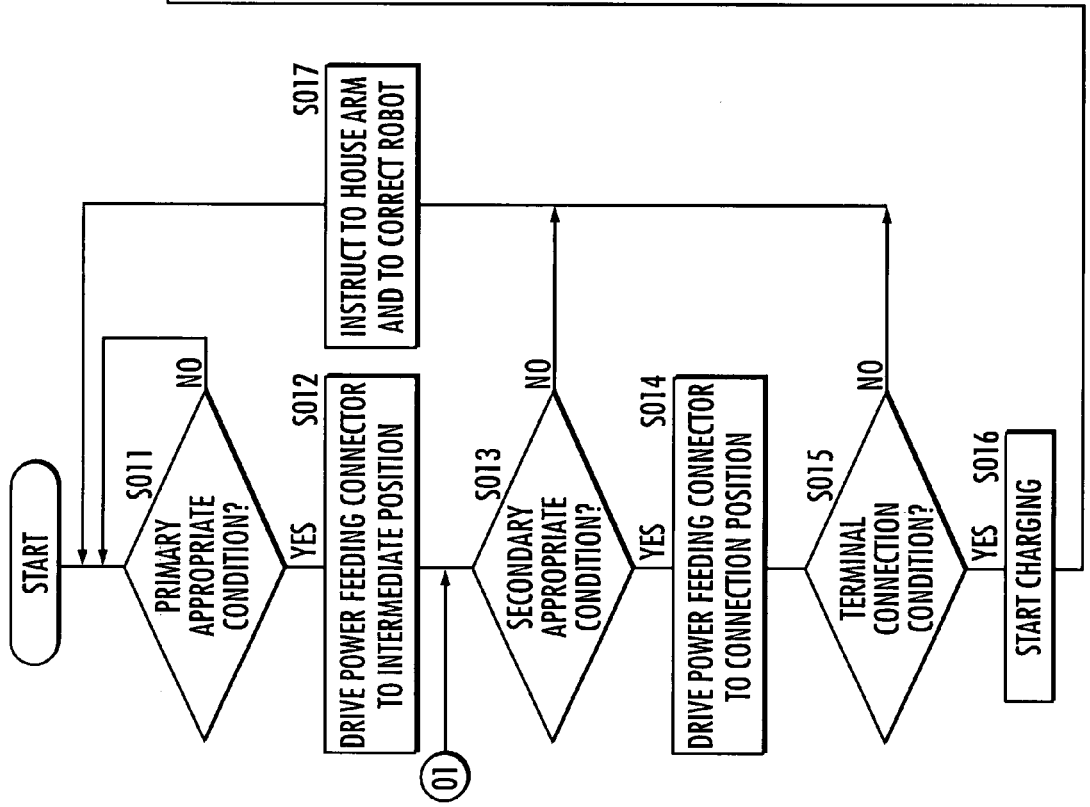
FIG. 6 is a drawing describing the function of a battery charger of the present invention.
Figure 7:
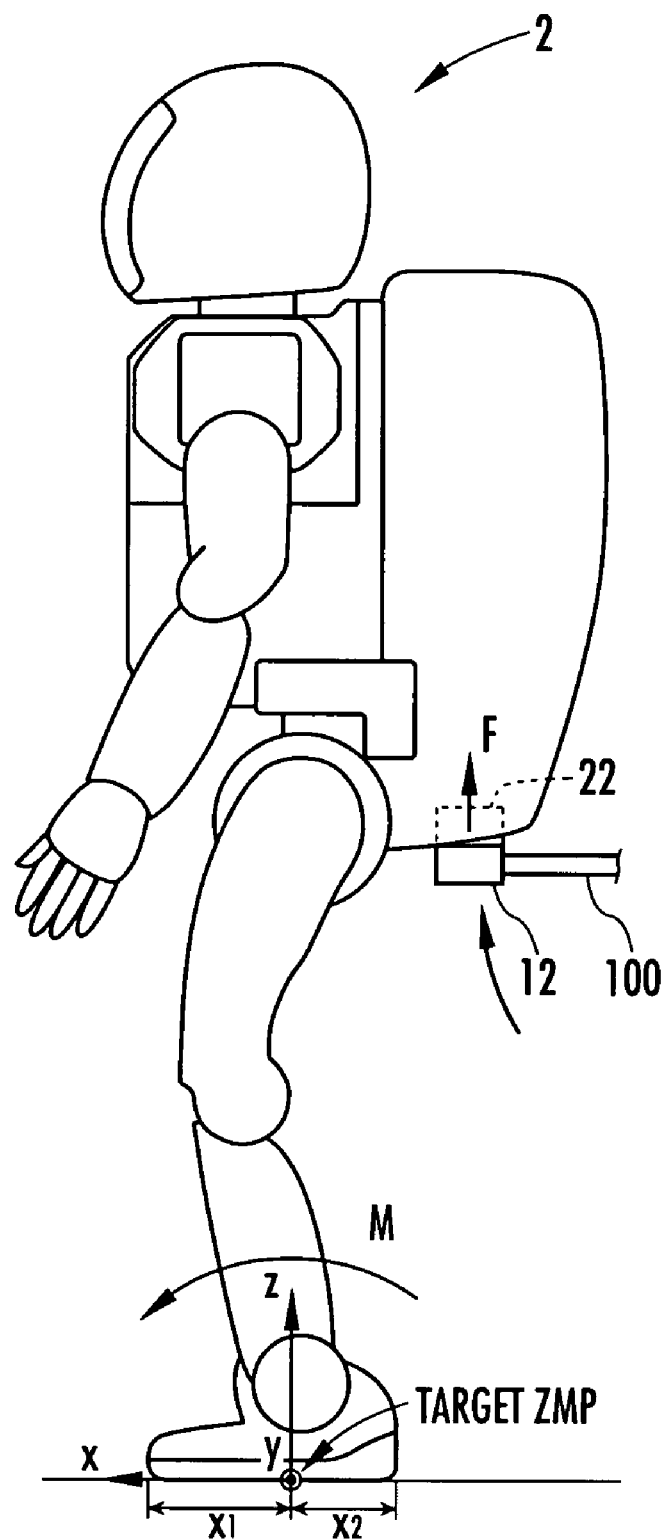
FIG. 7 is a drawing describing the function of a battery charger of the present invention.

FIG. 1 to FIG. 5 are descriptive drawings of the configuration of a battery charger of the present invention, and FIGS. 6 and 7 are descriptive drawings of the function of the battery charger of the present invention.

First, the configuration of the battery charger will be described with reference to the FIG. 1 to FIG. 5.

Figure 1:
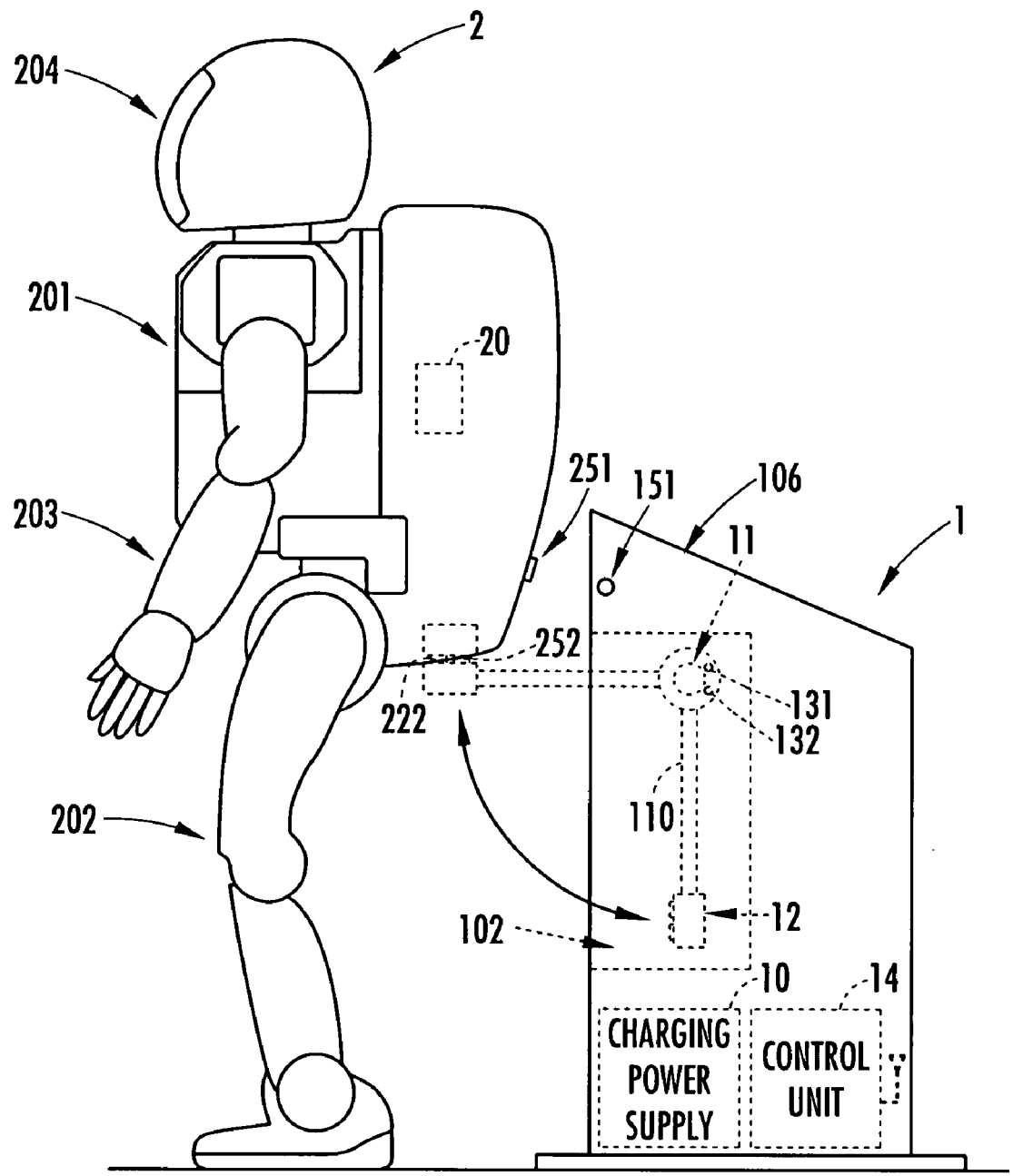
FIG. 1 is a drawing describing the configuration of a battery charger of the present invention.

A battery charger 1 as shown in FIG. 1 has a charging power supply 10 outputting a current for charging a battery 20 mounted aboard a legged moving robot 2, a power feeding connector 12 connected to a power receiving connector 22 disposed at the lower rear part of the robot 2, and a controlling unit (controller) 14.

The charging power supply 10 includes a voltage transformation circuit to decrease a voltage of the AC power supplied via a plug, a rectification circuit to perform full-wave rectification of the AC voltage output from the voltage transformation circuit, and a DC/DC converter to convert the DC voltage output from the rectification circuit. The charging power supply 10 outputs a charging current to the battery 20. The battery charger 1 has a substantially cylindrically shaped base 100, and an arm 110 housed in a vertically elongated opening 102 provided in the side wall of the base 100. In the upper part of the base 100, an inclined surface is formed on which a panel 106 is provided with operation buttons and a display to display a charging current value and the like.

Figure 2:
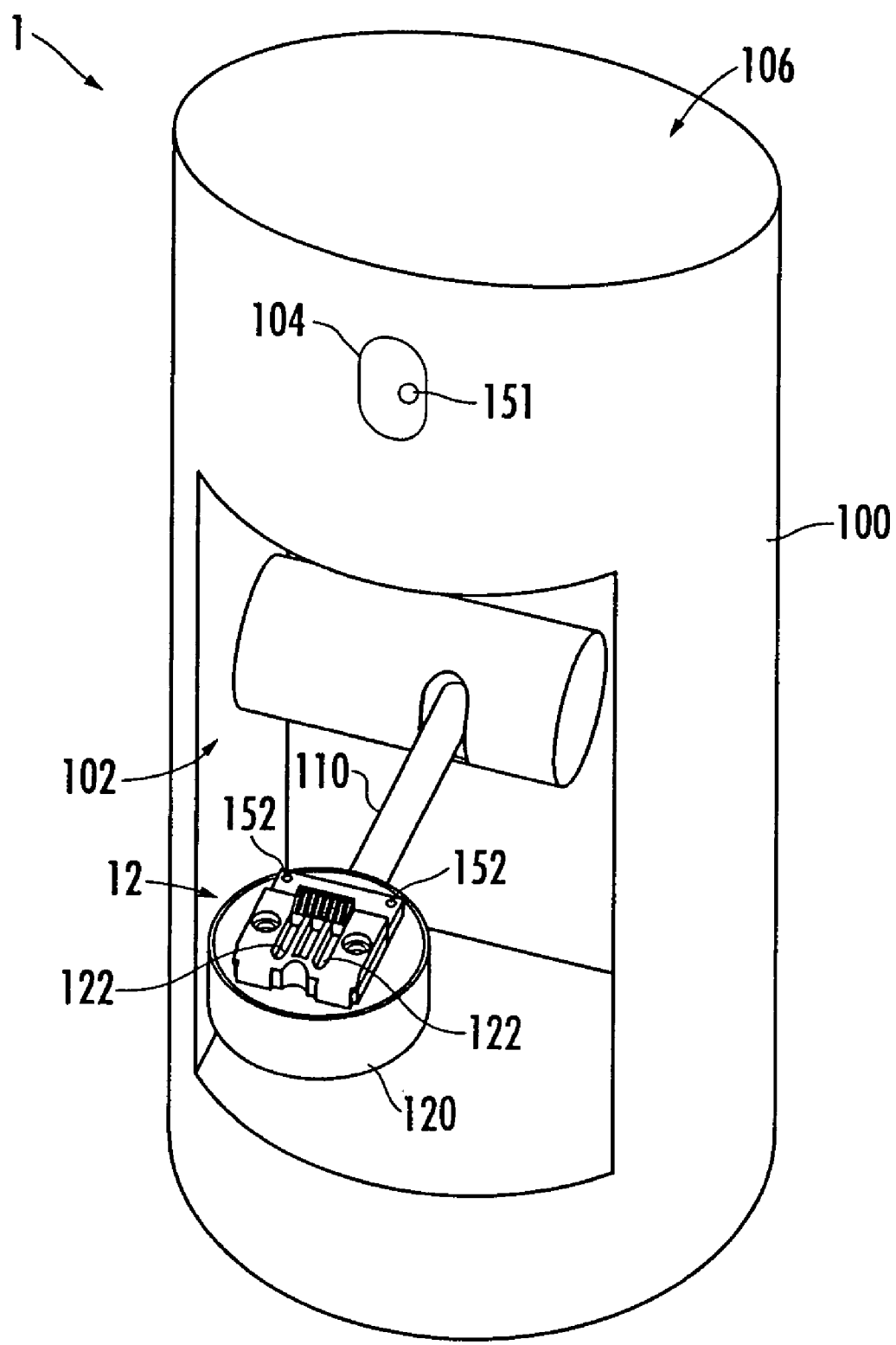
FIG. 2 is a drawing describing the configuration of a battery charger of the present invention.
Figure 3:
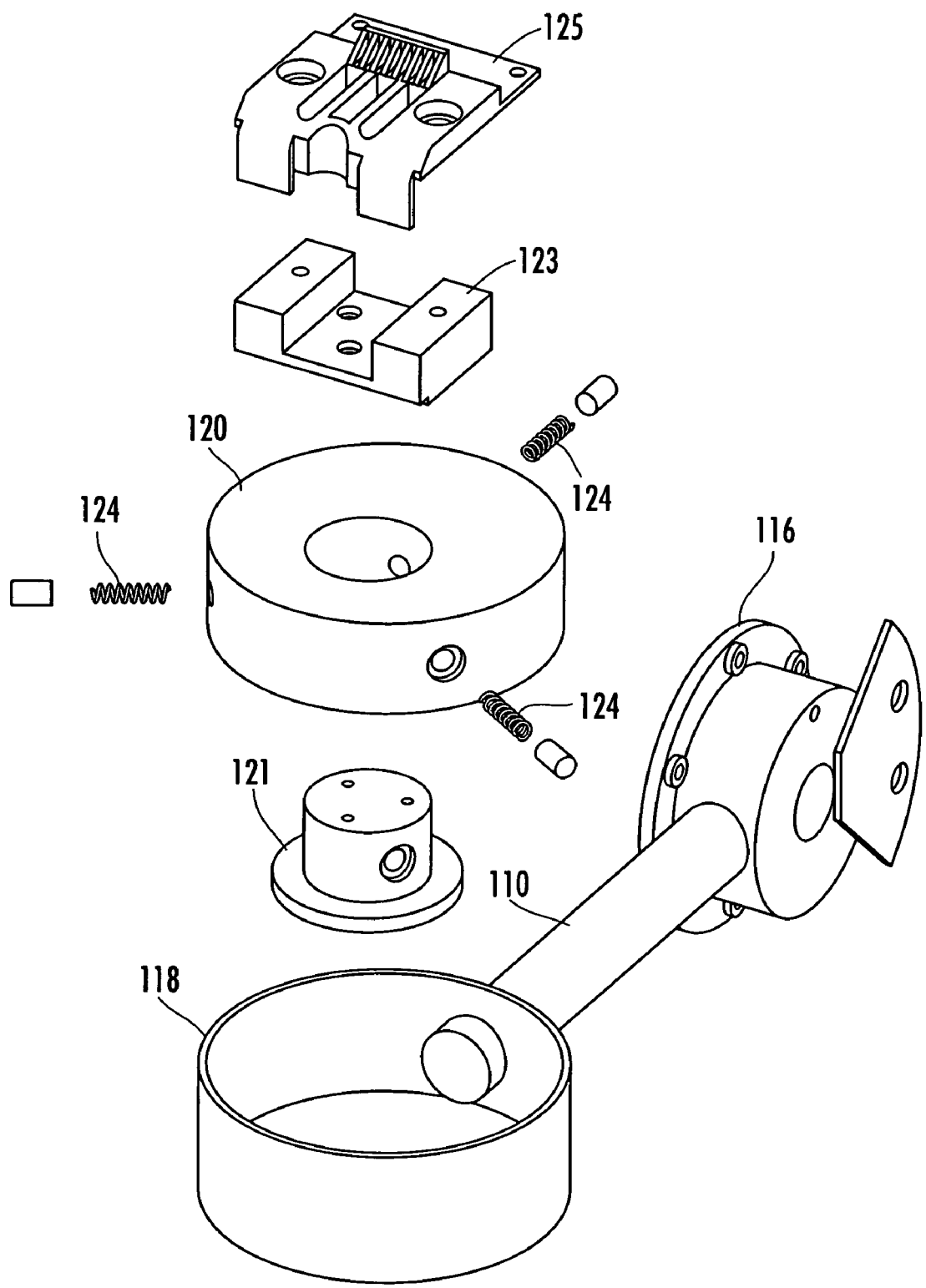
FIG. 3 is a drawing describing the configuration of a battery charger of the present invention.

The power feeding connector 12 has a power feeding terminal 122 connectable to a power receiving terminal 222 of the power receiving connector 22 (refer to FIG. 2). The power feeding connector 12, as shown in FIG. 3, has a base 120 housed and fixed in a cylindrical housing 118 with a closed bottom attached at the end of the arm 110, a lower part member 121 that forms a substantially cylindrical shape to loosely mate with the central aperture of the base 120, a middle part member 123 that is fixed with an upper side of the lower part member 121, at the upper side of the base 120, and an upper part member 125 that is fixed with the upper side of the middle part member 123. The lower member 121, as shown in FIG. 4A, is held to the base 120 via three springs, and, as shown in FIG. 4B, is movable with respect to the base 120 by deformation of the three springs 124.

The battery charger 1 has a driving mechanism of the arm 110 having a motor 11, a first driving member 111, a second driving member 112, and a third driving member 113, as shown in FIG. 5. The first driving member 111 is connected to an output shaft of the motor 11. The second driving member 112 connects the first driving member 111 via a through hole formed in a base part 116 of the arm 110. The third driving member 113 is connected to the base part 116 of the arm 110. The second driving member 112 and the third driving member 113 enable mutual transfer of force via a suspension spring 114 (corresponding to the buffer mechanism of the present invention). A knock-pin 117 that limits a movement of the second driving member 112 within a range of a cutaway part 115 provided on an upper part of the second driving member 112 is mounted on the base part 116 of the arm 110.

The power feeding connector 12 is driven by a relatively simple configuration such that the arm 110 is rotated in a given direction from an initial condition. When it is not necessary to charge the battery 20 mounted aboard the robot 2, housing the arm 110 and the power feeding connector 12 into the base 100 avoids the case in which the arm 110 become an obstacle to movement of the robot 2. When the power feeding connector 12 is connected to the power receiving connector 22 by the suspension spring 114, the case in which the force applied by the robot 2 is directly transmitted to the output shaft of the motor 11 can be avoided.

The base part 116 of the arm 110 has a first proximity sensor 131 (corresponding to the first sensor) and a second proximity sensor 132 (corresponding to the second sensor) outputting signals responsive to the rotational position of the arm 110. The first proximity sensor 131 outputs a signal responsive to the power feeding connector 12 stopping short of a reference connection position relative to the power receiving connector 22. Specifically, the first proximity sensor 131 is a contactless sensor utilizing electromagnetic induction, which outputs a signal when proximity of an upper protruding piece 1121 of the second driving member 112 is detected over a prescribed period of time. The second proximity sensor 132 outputs a signal when the power feeding connector 12 moves beyond a reference connection position relative to the power receiving connector 22. Specifically, the second proximity sensor 132 is a contactless sensor utilizing electromagnetic induction, which outputs a signal when proximity of a lower protruding piece 1122 of the second driving member 112 is detected over a prescribed period of time.

In the base 100, a first optical sensor 151 faces toward the outside of the base 100 from an aperture 104 provided the opening 102. The first optical sensor 151 has a first light-emitting element such as LED, and a first light-receiving element.

The power feeding connector 12 has a second optical sensor 152 that can oppose the power receiving connector 22 as shown in FIG. 2. The second optical sensor 152 has a second light-emitting element, such as a laser emitting a spot beam, and a second light-receiving element.

A control unit 14 includes a CPU, ROM, RAM, and I/O devices. The control unit 14, for example, controls the movement of the arm 110, attached to the end of which is the power feeding connector 12, so that a moment generated about a target zero moment point (ZMP) of the robot 2 by the connection of the power feeding connector 12 with the power receiving connector 22 of the robot 2, which is standing, falls within a range of the moment of floor reaction force generatable about the target ZMP.

The robot 2 has a base body 201, right and left legs 202 extending from the lower part of the base body 201, right and left robot arms 203 extending from the upper part of the base body 201, and a head 204 on the upper part of the base body 201. The robot 2 can walk or run by moving the right and left legs 202. The robot 2 can keep stable posture by appropriately moving the base body 201 and right and left arms 203, and the like. The robot 2 has a first reflector 251 on the rear part of the base body 201, and a second reflector 252 on the lower rear part of the base body 201.

The function of the battery charger in above noted configuration will be described, referring to FIG. 6 and FIG. 7.

With the arm 110 and the power feeding connector 12 housed in the base 100, the control unit 14 verifies whether the standing position and the posture of the robot 2 are in a primary appropriate condition, in which the power feeding connector 12 can connect to the power receiving connector 22 by moving the former as is (step S011 in FIG. 6). Specifically, the control unit 14 verifies whether the standing position and posture of the robot 2 are in the primary appropriate condition, by whether the light emitted by the first light-emitting element of the first optical sensor 151 and reflected by the first reflector 251 disposed on the rear surface of the robot 2 is detected by the first light-receiving element of the first optical sensor 151.

The robot 2 moves next to the battery charger 1 either when the robot 2 itself determines that the battery 20 requires charging, or when the charging of the battery 20 is instructed from outside. The robot 2 then stops in a standing posture with its back to the battery charger 1, as shown in FIG. 1. The orientation of the robot 2 relative to the battery charger 1 may be forward, sideways, or other orientations, depending upon the position of the power receiving connector 22. The robot 2 can move while verifying the position of the battery charger 1 or the position of a marker disposed on the floor surrounding the battery charger 1, by processing an image obtained via a camera mounted, for example, on the head 204 on the robot 2.

When the control unit 14 verifies that the standing position and posture of the robot 2 are in the primary appropriate condition (YES at step S011 of FIG. 6), the control unit 14 swings the arm 110 to raise the power feeding connector 12 up to an intermediate position at which it can oppose the power receiving connector 22 (step S012 in FIG. 6).

Next, the control unit 14 verifies whether the standing position and posture of the robot 2 are in a secondary appropriate condition, in which the power feeding connector 12 can be moved as is to connect it to the power receiving connector 22 (step S013 in FIG. 6). Specifically, the control unit 14 verifies whether the standing position and posture of the robot 2 are in the secondary appropriate condition, by whether the light emitted from the second light-emitting element of the second optical sensor 152 and reflected by the second reflector 252 disposed at the lower rear part of the base body 201 of the robot 2 is detected by the second light-receiving element of the second optical sensor 152.

When the control unit 14 verifies that the standing position and posture of the robot 2 are in the secondary appropriate condition (YES at step S013 in FIG. 6), the control unit 14 raises the arm 110 further to move the power feeding connector 12 to a reference connection position relative to the power receiving connector 22 (S014 in FIG. 6). By doing this, the power feeding connector 12 can be connected to the power receiving connector 22 from below. When this occurs, the control unit 14 controls the movement of the power feeding connector 12 and, by extension, the arm 110, so that the moment M generated about the target ZMP of the robot 2 by the force F acting on the robot 2 when the power feeding connector 12 is connected to the power receiving connector 22 is within the range of the floor repelling moment genaratable about the target ZMP. Specifically, the movement of the arm 110 is controlled so that the moment M (positive for the counterclockwise direction in FIG. 5) satisfies the following relationship (1).

$$-mgx_1 \leq M \leq -mgx_2 \tag{1}$$

In the above, m is the mass of the robot 2, g is the gravitational acceleration, $x_1$ (>0) is the x coordinate of the toe position in the orthogonal coordinate system shown in FIG. 7, in which the target ZMP is taken as the origin O, and $x_2$ (<0) is the x coordinate of the heel position in this coordinate system.

The control unit 14 controls the movement of the arm 110 to connect the power feeding connector 12 to the power receiving connector 22 so that, when the power feeding connector 12 is connected to the power receiving connector 22, the z component (perpendicular direction component) $F_z$ of the force F is larger than the x component $F_x$ and the y component $F_y$ of the force F. That is, the movement of the arm 110 may be controlled so that not only the relationship (1), but also the relationship (2) is satisfied.

$$|F_x| < |F_z| \text{ and also } |F_y| < |F_z| \tag{2}$$

The power feeding connector 12 is movably held to a folding part 120 by a spring 124 (refer to FIG. 4A and FIG. 4B). For this reason, even with a slight offset in the positions of the power feeding connector 12 and the power receiving connector 22 from the correct position, it is possible to connect the power feeding connector 12 and the power receiving connector 22 without forcing a change of the standing position and posture of the robot 2.

When the power feeding connector 12 and the power receiving connector 22 are connected, the force that acts between the battery charger 1 and the robot 2 accompanying the connection can be moderated by the resilient force of the suspension spring 114 (refer to FIG. 5). The resilient force of the suspension spring 114 also pushes the power feeding connector 12 against the power receiving connector 22 when the power feeding connector 12 and the power receiving connector 22 are in the connected condition.

When the control unit 14 verifies that the standing position and posture of the robot 2 are not in the secondary appropriate condition (NO at step S013 in FIG. 6), the control unit 14 swings the arm 110 downward to house it in the base 100 (step S017). The control unit 14 acts as an operation instructing section to send to the robot 2, by wireless or wired means, an instruction signal that corrects at least one of the standing position and posture of the robot 2 (step S017 in FIG. 6). After the robot 2 corrects, for example, its standing position in response to the instruction signal, the processing that verifies the primary appropriate condition is executed again (step S011 in FIG. 6).

Next, the control unit 14 verifies whether the power feeding terminal 122 of the power feeding connector 12 and the power receiving terminal 222 of the power receiving connector 22 are connected (step S015 in FIG. 6). Specifically, whether the power feeding terminal 122 and the power receiving terminal 222 are connected is verified by the presence or absence of a signal output from the first proximity sensor 131. For example, when the power feeding connector 12 comes into contact with the protruding part below the power receiving connector 22 of the robot 2, the swing angle of the arm 110 remains at a first prescribed angle that is less than the reference angle which corresponds to the reference connection position. This enables recognition of non-connected condition between the power feeding terminal 122 and the power receiving terminal 222 when a signal is output from the first proximity sensor 131. Whether the power feeding terminal 122 and the power receiving terminal 222 are connected may be verified by the additional or alternative adoption of the method disclosed by the Japanese Laid-open Patent Application 2006-68845.

The control unit 14 starts the output of the charging current from the charging power supply 10 to the battery 20 (step S016 in FIG. 6) when the connection of the power feeding terminal 122 and the power receiving terminal 222 is verified (YES at step S015 in FIG. 6), thereby charging the battery 20 mounted aboard on the robot 2. When the non-connection of the power feeding terminal 122 and the power receiving terminal 222 is verified (NO at step S015 in FIG. 6), the control unit 14 swings the arm 110 downward to house it in the base 100 (step S017 in FIG. 6). The control unit 14 acts as an operation instructing section to send to the robot 2, by wireless or wired means, an instruction signal that corrects at least one of the standing position and posture of the robot 2 (step S017 in FIG. 6). After the robot 2 corrects, for example, its standing position responsive to the instruction signal, the processing that verifies the primary appropriate condition is executed again (step S011 in FIG. 6).

After the above, the control unit 14 verifies whether the power feeding connector 12 has moved upward beyond the reference connection position with respect to the power receiving connector 22 (step S018 in FIG. 6). Specifically, verification of whether the power feeding connector 12 has moved beyond the reference connection position with respect to the power receiving connector 22 is made by the presence or absence of a signal output from the second proximity sensor 132. When the robot 2 raises slightly its lower back, for example, in order to start to move by an autonomous judgment by the robot itself or responsive to instruction of outside, the power feeding connector 12 is moved upward beyond the reference connection position with respect to the power receiving connector 22 by an urging force from the suspension spring 114. By doing this, when the swing angle of the arm 110 remains at a second prescribed angle that is greater than the reference angle which corresponds to the reference connection position, the second proximity sensor 132 outputs signals to enable recognition of the movement of the power feeding terminal 122 beyond the reference connection position.

When the control unit 14 verifies that the power feeding connector 12 has not moved beyond the reference connection position with respect to the power receiving connector 22 (NO at step S018 in FIG. 6), the control unit 14 continues the output from the charging power supply 10. When the control unit 14 verifies that the power feeding connector 12 has moved beyond the reference connection position with respect to the power receiving connector 22 (YES at step S018 in FIG. 6), the control unit 14 stops the output from the charging power supply 10 to immediately stop a charge to the battery 20 (step S019 in FIG. 6).

Subsequently, the control unit 14 swings the arm 110 to move the power feeding connector 22 downward to the intermediate position (step S020 in FIG. 6). The control unit 14 then determines whether the battery 20 has been completely charged (step S021 in FIG. 6). For example, when an integrated value from the start to the stop of the output of the charging current by the charging power supply 10 is greater than a prescribed value, the control unit 14 determines that the battery 20 is completely charged. The prescribed value may be variably set responsive to movement ranges or movement degrees after the robot 2 removes from the battery charger 1.

When the control unit 14 determines that the battery 20 is completely charged (YES at step S021 in FIG. 6), the arm 110 causes to move further downward to house the opening of the base 100 (step S022 in FIG. 6). When the control unit 14 to verifies that the battery 20 is not completely charged (NO at step S021 in FIG. 6), the control unit 14 sends to the robot 2 a command signal prohibiting movement (step S023 in FIG. 6). By doing this, for example, the verifying processing of the second appropriate condition is executed again to restart charging the battery 20 (refer to the steps S013 to S016 in FIG. 6).

The battery charger 1, functioning as described above, controls the movement of the arm 110 and the power feeding connector 12, so that, when the power feeding connector 12 is moved to connect to the power receiving connector 11 of the robot 2, which is stopped in the standing condition, the moment M generated about the target ZMP of the robot 2 is within the range of the floor reaction moment [$-mgx_1$, $-mgx_2$] generatable about the target ZMP of the robot (step S014 in FIG. 6, refer to the relationship (1)). Specifically, the movement of the power feeding connector 12 and the arm 110 is controlled so that an excessive force that the robot 2 cannot resist in a standing posture does not act on the robot 2 from the power feeding connector 12. When the power feeding connector 12 is connected to the power receiving connector 22, the magnitude of the z component of the force F is larger than the x component and the y component of the force F (step S014 in FIG. 6, refer to the relationship (2)). By doing this, when the power feeding connector 12 and the power receiving connector 22 are connected, even if the robot 2 receives a force from the power feeding connector 12, an unstable posture of the robot, such as wavering can be reliably avoided.

It is verified, in two steps, whether or not the standing position and posture of the robot are in an appropriate condition such that the power feeding connector 12 can be moved as is to connect to the power receiving connector 22 and, providing that the control unit 14 verifies that the standing position and posture of the robot 2 are in the appropriate condition, the power feeding connector 12 moves in a direction in which the power feeding connector 12 approaches the power receiving connector 22 (refer to YES at step S011, YES at step S012 and S013, and step S014 in FIG. 6). By doing this, the power feeding connector 12 and the power receiving connector 22 are connected and the battery 20 is reliably charged.

The first sensor 111 outputs a signal responsive to the power feeding connector 12 stopping short of a connection position relative to the power receiving connector 22, and the robot 2 is instructed of at least one of a corrective action of a standing position and posture responsive to the output signal (refer to NO at step S015, and step S017 in FIG. 6). By doing this, for example, the power feeding connector 12 touches another part of the robot 2, and if there is a high possibility that the power feeding connector 12 and the power receiving connector 22 fail to connect, according to this condition, the position and posture of the robot 2 are corrected to perform a reconnection of the power feeding connector 12 and the power receiving connector 22.

Because charging current is output from the charging power supply 10, providing that it is verified that the power feeding connector 12 and the power receiving connector 22 are connected, responsive to the presence or absence of a signal output from the first sensor 111, the battery charger 20 is charged safely and reliably (refer to YES at step S015, and step S016 in FIG. 6).

The second proximity sensor 132 outputs a signal responsive to the power feeding connector 12 moving upward beyond the reference connection position from the condition in which the power feeding connector 12 exists at the reference connection position relative to the power receiving connector 22, and the power feeding connector 12 is moved in a direction away from the power receiving connector 22 responsive to the output signal (refer to YES at step S018, and step S020 in FIG. 6). By doing this, the power feeding connector 12 and the power receiving connector 22 gradually go into the non-connected condition by the movement that the robot 2. The charging current supply is stopped, and the arm 110 swings to move the power feeding connector 12 downward, so that the robot 2 can move without impedence, responsive to this condition.

In the foregoing embodiment, the arm 110 swings to cause the power feeding connector 12 to be moved in a downward direction in which the power feeding connector 12 approaches the power receiving connector 22 of the robot 2. However, it will be appreciated that modification of driving may be made using various kinds of embodiments, such as straight line movement and parallel movement of the power feeding connector 12, responsive to the position and direction of the power feeding connector 22. For example, in the case in which the power receiving connector 22 faces upward or sideward when the robot 2 is in standing immovable posture, the power feeding connector 12 may be driven to approach the power receiving connector 22 in a upward or sideward direction. After the power feeding connector 12 is caused to move sideward and then to move upward, the power feeding connector 12 may be caused to approach the power receiving connector 22 by a combination of movements in various directions.

What is claimed is:

1. A battery charger for charging a battery mounted aboard a legged moving robot by outputting power from a charging power supply, the battery charger comprising:
   a power feeding connector connectable to a power receiving connector of the robot; and
   a controller configured to move the power feeding connector to connect with the power receiving connector of the robot in a standing posture, so that a moment generated about a target zero moment point (ZMP) of the robot falls within a range of a moment of a floor reaction force generatable about the target ZMP.

2. The battery charger according to claim 1, wherein the controller is further configured to move the power feeding connector, so that a vertical component of a force applied to the robot becomes greater than a horizontal component thereof, wherein the force is caused by connecting the power feeding connector to the power receiving connector of the robot in the standing posture.

3. The battery charger according to claim 1, wherein the controller is further configured to move the power feeding connector to come into contact with a charging part of the robot in the standing posture from an upward direction or a downward direction.

4. The battery charger according to claim 1, further comprising:
   a holding mechanism configured to movably hold the power feeding connector.

5. The battery charger according to claim 1, further comprising:
   a first sensor configured to output a signal responsive to the power feeding connector stopping short of a reference connection position relative to the power receiving connector, and
   an operation instructing section configured to output a signal to instruct the robot of a position and posture, or of a corrective action of the position and the posture responsive to an output signal from the first sensor.

6. The battery charger according to claim 1, further comprising:
   a second sensor configured to output a signal responsive to the power feeding connector moving beyond the reference connection position relative to the power receiving connector,
   wherein the controller is further configured to move the power feeding connector in a direction away from the power receiving connector responsive to an output signal from the second sensor.

7. The battery charger according to claim 1, further comprising:
   a buffer mechanism configured to buffer an external force that the power feeding connector receives.

8. The battery charger according to claim 1, wherein the controller is further configured to verify, in one or a plurality of steps, whether or not the standing position and the posture of the robot are in an appropriate condition such that the power feeding connector can be moved to connect to the power receiving connector, and
   wherein providing that the controller verifies that the standing position and the posture of the robot are in the appropriate condition, the controller is further configured to move the power feeding connector in a direction in which the power feeding connector approaches the power receiving connector.

9. The battery charger according to claim 1, wherein the controller is further configured to verify whether or not the power feeding connector and the power receiving connector are connected, and
   wherein providing that the controller verifies that the connectors are connected, the controller is further configured to output a charging current from the charging power supply.

10. The battery charger according to claim 1, further comprising:
an arm to the end of which the power feeding connector is attached,
wherein the controller is further configured to connect the power feeding connector to the power receiving connector by driving the arm in a given direction from an initial condition.

11. The battery charger according to claim 10, further comprising:
a base configured to house the power feeding connector and the arm.

* * * * *